United States Patent
Figov et al.

(10) Patent No.: US 8,879,789 B1
(45) Date of Patent: Nov. 4, 2014

(54) OBJECT ANALYSIS USING MOTION HISTORY

(75) Inventors: Zvi Figov, Modiin (IL); Gadi Zimerman, Hod-Hashron (IL); Amir Sole, Rehovot (IL)

(73) Assignee: Verint Americas Inc., Melville, NY (US)

( * ) Notice: Subject to any disclaimer, the term of this patent is extended or adjusted under 35 U.S.C. 154(b) by 225 days.

(21) Appl. No.: 13/355,112

(22) Filed: Jan. 20, 2012

Related U.S. Application Data

(60) Provisional application No. 61/434,760, filed on Jan. 20, 2011.

(51) Int. Cl.
*G06K 9/00* (2006.01)
*G08B 13/196* (2006.01)
*G06T 7/20* (2006.01)

(52) U.S. Cl.
CPC ...... *G08B 13/19602* (2013.01); *G06K 9/00785* (2013.01); *G06T 7/2006* (2013.01); *G06K 9/00335* (2013.01)

USPC .......................................................... 382/103

(58) Field of Classification Search
USPC ................... 382/103–104; 701/210, 221, 300
See application file for complete search history.

(56) References Cited

U.S. PATENT DOCUMENTS

| | | | |
|---|---|---|---|
| 2007/0127774 A1* | 6/2007 | Zhang et al. | 382/103 |
| 2007/0223808 A1* | 9/2007 | Kerr | 382/159 |
| 2010/0202663 A1* | 8/2010 | Kim et al. | 382/107 |

\* cited by examiner

*Primary Examiner* — Amara Abdi
(74) *Attorney, Agent, or Firm* — Meunier Carlin & Curfman

(57) ABSTRACT

A method for object analysis using motion history is provided. The method includes receiving video data comprising a plurality of frames of a scene comprising one or more elements, and processing the video data to produce a motion history image comprising motion history values of at least one of the elements. The method also includes identifying the one of the elements for further processing if a characteristic of the motion history image satisfies a criteria.

18 Claims, 4 Drawing Sheets

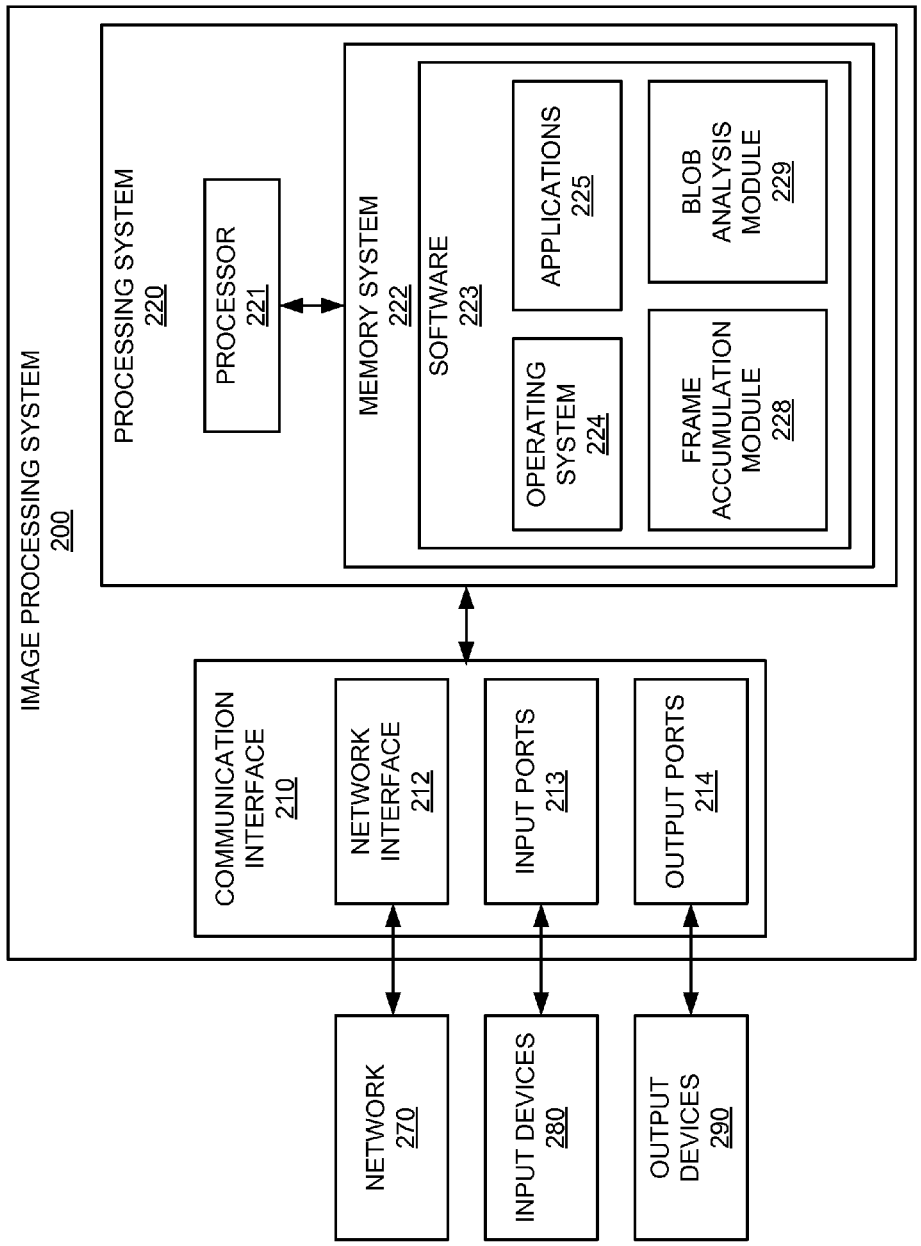

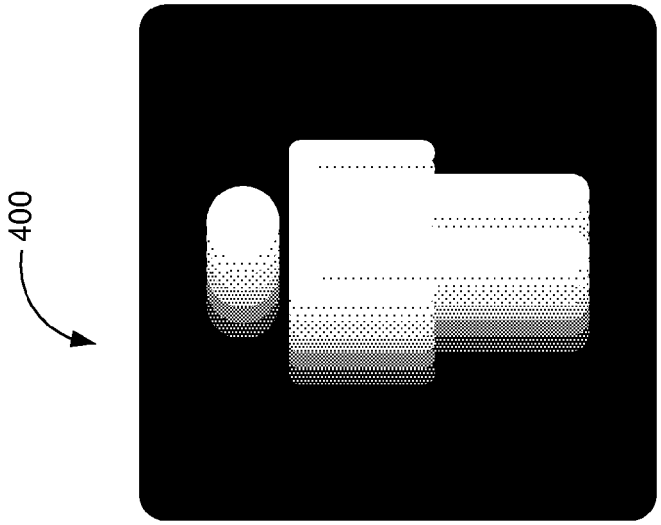
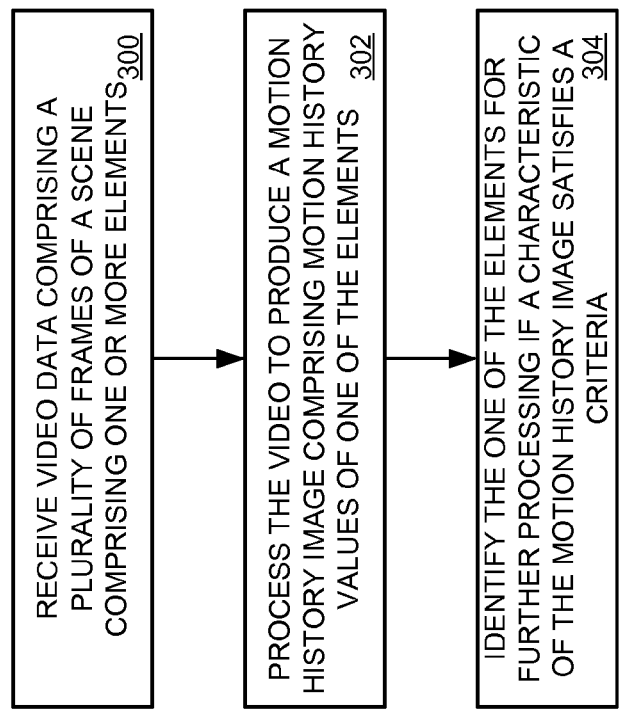
Figure 4
Figure 3

OBJECT ANALYSIS USING MOTION HISTORY

RELATED APPLICATIONS

This application hereby claims the benefit of and priority to U.S. Provisional Patent Application 61/434,760, titled "OBJECT ANALYSIS USING MOTION HISTORY", filed on Jan. 20, 2010, which is hereby incorporated by reference in its entirety.

TECHNICAL FIELD

Aspects of the invention are related, in general, to the field of image processing and analysis.

TECHNICAL BACKGROUND

Image analysis involves performing processes on images or video in order to identify and extract meaningful information from the images or video. In many cases, these processes are performed on digital images using digital image processing techniques. Computers are frequently used for performing this analysis because large amounts of data and complex computations may be involved. Many image processing techniques are designed to emulate recognition or identification processes which occur through human visual perception and cognitive processing. Automated detection and tracking of moving objects is particularly challenging in the presence of other scene changes which may include illumination changes, additional moving objects, or other scene variations.

As scenes increase in complexity and in the number of elements contained within the scene, it becomes more and more difficult to determine which elements of a scene are worth investigating further. For example, random motion of a balloon in a scene may result in the balloon being incorrectly identified for further processing wasting processor and user time in analyzing the motion of the balloon and deciding to ignore the balloon as an inconsequential element of the scene.

OVERVIEW

A method for object analysis using motion history is provided. The method includes receiving video data comprising a plurality of frames of a scene comprising one or more elements, and processing the video data to produce a motion history image comprising motion history values of one of the elements. The method also includes identifying the one of the elements for further processing if a characteristic of the motion history image satisfies a criteria.

In a further embodiment, a computer system configured for object analysis using motion history is provided. The computer system includes a memory configured to store video data, and a processor coupled to the memory. The processor is configured to receive video data comprising a plurality of frames of a scene comprising one or more elements, and to process the video data to produce a motion history image comprising motion history values of one of the elements. The processor is also configured to identify the one of the elements for further processing if a characteristic of the motion history image satisfies a criteria.

In another embodiment, a non-transitory computer readable medium having stored thereon program instructions object analysis using motion history is provided. When executed by a computer system, the instructions direct the computer system to receive video data comprising a plurality of frames of a scene comprising one or more elements, and to process the video data to produce a motion history image comprising motion history values of one of the elements. The instructions also direct the computer system to identify the one of the elements for further processing if a characteristic of the motion history image satisfies a criteria.

BRIEF DESCRIPTION OF THE DRAWINGS

FIG. 2 illustrates an embodiment of an image processing system for object analysis using motion history;

FIG. 3 illustrates a flowchart of an image processing method for object analysis using motion history;

FIG. 4 illustrates an example motion history image within an embodiment of an image processing system for object analysis using motion history;

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
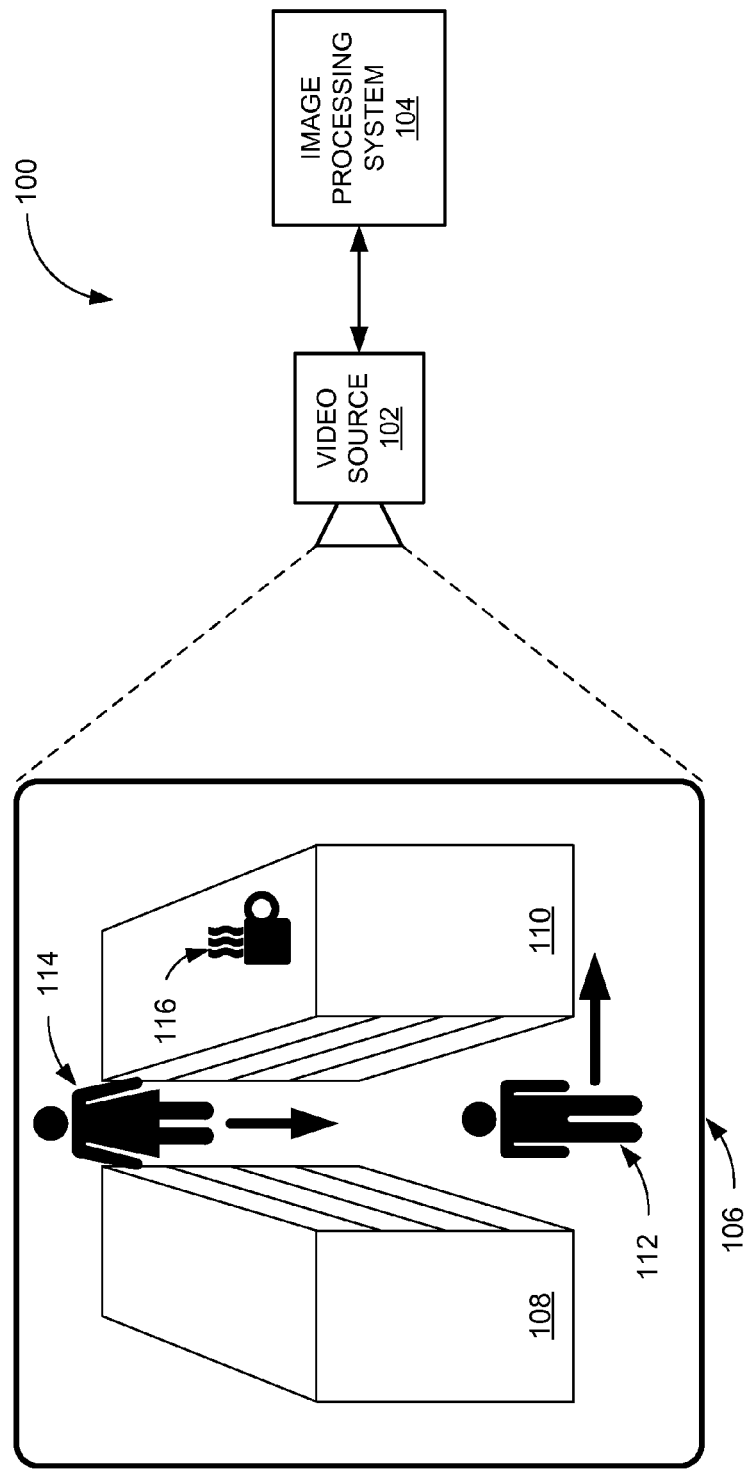
FIG. 1 illustrates an embodiment of an imaging system for object analysis using motion history.

FIG. 1 illustrates imaging system 100. Imaging system 100 comprises video source 102 and image processing system 104. Video source 102 is configured to capture video data of scene 106. In this example, scene 106 includes a plurality of elements. These elements include display 108, display 110, man 112, woman 114, and coffee with steam rising 116. In this example scene, woman 114 is moving towards video source 102, while man 112 is moving from left to right within scene 106.

Video source 102 may comprise any device having the capability to capture video or images. Video source 102 comprises circuitry and an interface for transmitting video or images. Video source 102 may be a device which performs the initial optical capture of video, may be an intermediate video transfer device, or may be another type of video transmission device. For example, video source 102 may be a video camera, still camera, internet protocol (IP) camera, video switch, video buffer, video server, or other video transmission device, including combinations thereof.

Image processing system 104 may comprise any device for processing or analyzing video, video streams, or images. Image processing system 104 comprises processing circuitry and an interface for receiving video. Image processing system 104 is capable of performing one or more processes on the video streams received from video source 102. The processes performed on the video may include viewing, storing, transforming, mathematical computations, modifications, object identification, analytical processes, conditioning, other processes, or combinations thereof. Image processing system 104 may also comprise additional interfaces for transmitting or receiving video streams, a user interface, memory, software, communication components, a power supply, or structural support. Image processing system 104 may be a video analytics system, server, digital signal processor, computing system, or some other type of processing device, including combinations thereof.

Video source 102 and image processing system 104 communicate via one or more links which may use any of a variety of communication media, such as air, metal, optical fiber, or any other type of signal propagation path, including combinations thereof. The links may use any of a variety of communication protocols, such as internet, telephony, optical networking, wireless communication, wireless fidelity, or any other communication protocols and formats, including combinations thereof. The link between video source 102 and image processing system 104 may be direct as illustrated or may be indirect and accomplished using other networks or intermediate communication devices.

It should be understood that imaging system 100 may contain additional video sources, additional image processing systems, or other devices.

FIG. 2 illustrates image processing system 200. Image processing system 200 includes communication interface 210 and processing system 220. Processing system 220 is linked to communication interface 210 through a communication link.

Communication interface 210 includes network interface 212, input ports 216, and output ports 218. Communication interface 210 includes components that communicate over communication links, such as network cards, ports, RF transceivers, processing circuitry and software, or some other communication device. Communication interface 210 may be configured to communicate over metallic, wireless, or optical links. Communication interface 210 may be configured to use TDM, IP, Ethernet, optical networking, wireless protocols, communication signaling, or some other communication format, including combinations thereof. Image processing system 200 may include multiple network interfaces.

Network interface 212 is configured to connect to external devices over network 270. Network interface 212 may be configured to communicate in a variety of protocols. Input ports 216 are configured to connect to input devices 280 such as a video source, a storage system, a keyboard, a mouse, a user interface, or other input device. Output ports 218 are configured to connect to output devices 290 such as a storage system, other communication links, a display, or other output devices.

Processing system 220 includes processor 221 and memory system 222. Processor 221 includes microprocessor, or other circuitry that retrieves and executes operating software from memory system 222. Memory system 222 comprises software 223. Memory system 222 may be implemented using random access memory, read-only memory, a hard drive, a tape drive, flash memory, optical storage, or other memory apparatus.

Software 223 comprises operating system 224, applications 225, frame accumulation module 228, and blob analysis module 229. Software 223 may also comprise additional computer programs, firmware, or some other form of non-transitory, machine-readable processing instructions. When executed by processor 221, operating system 224 directs processing system 220 to operate image processing system 200 as described herein using applications 222, frame accumulation module 228, and blob analysis module 229. Frame accumulation module 228 directs processing system 220 to accumulate motion silhouettes of a moving object from multiple frames and create a three-dimensional blob which represents the motion history of the object as described below. Blob analysis module 229 directs processing system 220 to track the three-dimensional blobs and perform analysis on the blob as described below.

FIG. 3 illustrates a flowchart of an image processing method for object analysis using motion history. In this example embodiment of an image processing method for object analysis using motion history, image processing system 104 or 200 receives video data, comprising a plurality of frames, of scene 106, comprising one or more elements, from video source 102, (operation 300). Image processing system 200 processes the video to produce a motion history image comprising motion history values of one of the elements of scene 106, (operation 302).

Figure 6:
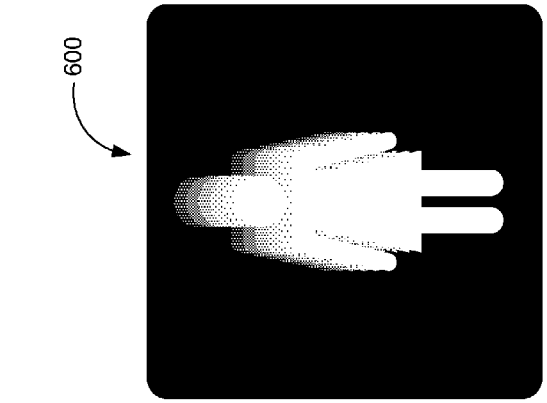
FIG. 6 illustrates an example motion history image within an embodiment of an image processing system for object analysis using motion history.

A motion history image is an image created by overlaying a plurality of images of an element such that more recent images of the element appear over older images of the element, resulting in a three-dimensional representation of the element as a plurality of motion history values. The motion history values also include time stamps for each of the images. Example motion history images are illustrated in FIGS. 4 and 6.

In some embodiments, motion history blobs are created for analysis. A motion history blob is a boundary or mask of the motion history image of an element within the scene. This boundary or mask may be determined using any of a wide variety of methods known within the graphic arts. In an embodiment, motion history blobs are created from a motion history image by a segmentation process constrained by the connectivity to the current motion and the maximum time difference between the timestamp that defines this connectivity. The result is an image that can be represented by a list of coordinates that spatially define the presence of a motion history image.

Figure 7:
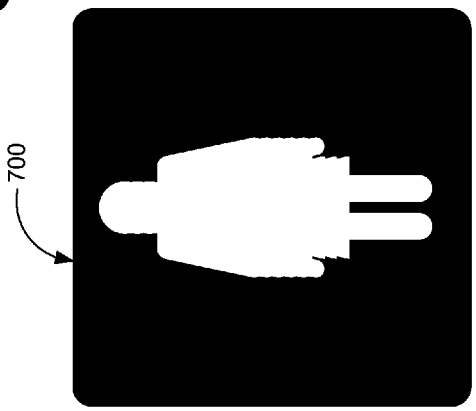
FIG. 7 illustrates an example motion history blob within an embodiment of an image processing system for object analysis using motion history.
Figure 5:
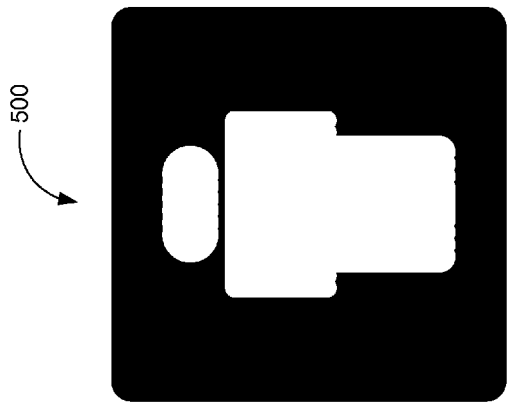
FIG. 5 illustrates an example motion history blob within an embodiment of an image processing system for object analysis using motion history.

The resulting area within the boundary is termed a motion history blob, or segmentation mask. This limits the area within the scene that the motion history values are analyzed with respect to the current element of the scene. For example, time duration of the motion may be calculated from the maximum and minimum timestamps of the motion history values within the current motion history blob. Ordinary object trackers may be used within the motion history blob to determine motions of the element of the scene bounded by the motion history blob. Example motion history blobs are illustrated in FIGS. 5 and 7.

Image processing system 200 then identifies the one of the elements of scene 106 for further processing if a characteristic of the motion history image satisfies a criteria, (operation 304). In some embodiments, the element is ignored if the characteristic of the motion history image fails to satisfy the criteria.

Various characteristics of the motion history image may be processed by image processing system 200 to determine if the element is worthy of further analysis. Since the motion history image is accumulated over the whole image, it doesn't have a shape per se. However, motion history image values within the boundary of the motion history blob may be used to determine if the element is worth further processing. If the motion history image values within the boundary of the motion history blob satisfy a criteria, the element is identified for further processing. If the motion history image values within the boundary of the motion history blob fail to satisfy a criteria, the element may be ignored.

Many other characteristics of the motion history image values within the boundary of a corresponding motion history blob such as size, speed, location, color, acceleration, time duration of motion, direction of travel, and the like may be used to identify elements for further processing. These characteristics may be processed to see if they satisfy a criteria for further processing. For example, when a speed characteristic is used, elements having speeds below a threshold speed may be ignored, while elements having speeds faster than the threshold speed may be identified for further processing. Selection of a criteria typically hinges on the type of characteristic of the motion history image used.

In another example, a system configured to count and track people entering a door uses motion history images and blobs to distinguish between people entering the door and people moving laterally past the door. Motion history values are calculated for the scene. Motion history blobs are then determined to separate the motion history data between various elements within the scene. Each motion history blob is analyzed in turn to determine a direction of motion. Only elements having a direction of motion satisfying a criteria of a motion coming through the door are identified for later processing. All other motion history blobs having directions of motion that fail this criteria are ignored.

Characteristics of the motion history image may be used to determine various characteristics of the element. For example, size and shape of the motion history blob containing motion history image values may be used to determine a size of a person, what they are wearing, and the like. Time duration may be used to determine when a person has started or stopped moving. This may be accomplished by using a time difference threshold to determine the connectivity of the motion to the most recent image.

Traditional element tracking methods include various techniques for differentiating between elements within a scene and shadows from those elements. In some embodiments, shadows need not be removed from a motion history image before processing. The shadow becomes part of the representation of the element and is included together with the motion of the element in the analysis.

Within scene 106, coffee with steam rising 116 has the potential to be incorrectly identified as an element requiring further processing since the steam will typically move somewhat between frames. However, when image processing system 200 processes the motion history image resulting from the steam, the random motion of the steam results in characteristics of its motion history image that are unlikely to satisfy any reasonable criteria for further processing of the element. In some embodiments, due to the random motion, a motion history blob will not be formed, or if it is formed, it is unlikely to satisfy the criteria for further processing (such as duration).

FIG. 4 illustrates an example motion history image 400 within an embodiment of an image processing system 200 for object analysis using motion history. This example motion history image 400 captures the motion of man 112 within scene 106 moving from left to right within scene 106. In this example, images of man 112 have been enlarged to show detail of motion history image 400.

In this example, six images of man 112 are combined to create motion history image 400. The most recent image of man 112 is on the right, while the oldest image of man 112 is on the left. The most recent image of man 112 is colored white in this example, while the oldest image of man 112 is colored black or dark grey. Intervening images of man 112 are colored shades of grey between the white image and the black or dark image. This allows a user to easily recognize the motion of man 112 from left to right across the scene.

FIG. 5 illustrates an example motion history blob 500 within an embodiment of an image processing system 200 for object analysis using motion history values. This example motion history blob 500 captures the motion of man 112 within scene 106 moving from left to right within scene 106. In this example, images of man 112 have been enlarged to show detail of motion history blob 500.

In this example, a boundary or mask of the motion history image 400 from FIG. 4 is determined. This boundary or mask may be determined using any of a wide variety of methods known within the graphic arts. In an embodiment, motion history blobs are created from a motion history image by a segmentation process constrained by the connectivity to the current motion and the maximum time difference between the timestamp that defines this connectivity. The result is an image that can be represented by a list of coordinates that spatially define the presence of a motion history image.

The resulting area within the boundary is termed a motion history blob, or segmentation mask. This limits the area within the scene where the motion history values are analyzed with respect to the current element of the scene. For example, time duration of the motion may be calculated from the maximum and minimum timestamps of the motion history values within the current motion history blob. Ordinary object trackers may be used within the motion history blob to determine motions of the element of the scene bounded by the motion history blob.

Various characteristics of motion history values within motion history blob 500 may be analyzed to determine if man 112 requires further processing by image processing system 200. For example, the time duration of the movement of man 112 (from the difference between the maximum timestamp and the minimum timestamp of the motion history image values within the blob, often measured in frames captured) may be used to determine how long man 112 has been moving and the rate of speed at which man 112 is moving. One or more of these characteristics may be compared to various criteria to determine if man 112 deserves further processing.

FIG. 6 illustrates an example motion history image 600 within an embodiment of an image processing system 200 for object analysis using motion history. This example motion history image 600 captures the motion of woman 114 within scene 106 moving from back to front within scene 106. In this example, images of woman 114 have been enlarged to show detail of motion history image 600.

In this example, six images of woman 114 are combined to create motion history image 600. The most recent image of woman 114 is in the front, while the oldest image of woman 114 is in the back. The most recent image of woman 114 is colored white in this example, while the oldest image of woman 114 is colored black or dark grey. Intervening images of woman 114 are colored shades of grey between the white image and the black or dark image. This allows a user to easily recognize the motion of woman 114 from back to front within the scene.

FIG. 7 illustrates an example motion history blob 700 within an embodiment of an image processing system 200 for object analysis using motion history. This example motion history blob 700 captures the motion of woman 114 within scene 106 moving from back to front within scene 106. In this example, images of woman 114 have been enlarged to show detail of motion history blob 700.

In this example, a boundary or mask of the motion history image 600 from FIG. 6 is determined. This boundary or mask may be determined using any of a wide variety of methods known within the graphic arts. In an embodiment, motion history blobs are created from a motion history image by a segmentation process constrained by the connectivity to the current motion and the maximum time difference between the timestamp that defines this connectivity. The result is an image that can be represented by a list of coordinates that spatially define the presence of a motion history image.

The resulting area within the boundary is termed a motion history blob, or segmentation mask. This limits the area within the scene where the motion history values are analyzed with respect to the current element of the scene. For example, time duration of the motion may be calculated from the maximum and minimum timestamps of the motion history values within the current motion history blob. Ordinary object trackers may be used within the motion history blob to determine motions of the element of the scene bounded by the motion history blob.

Various characteristics of motion history values within motion history blob 700 may be analyzed to determine if woman 114 requires further processing by image processing system 200. For example, the time duration of the movement of woman 114 (from the difference between the maximum timestamp and the minimum timestamp of the motion history image values within the blob, often measured in frames captured) may be used to determine how long woman 114 has been moving and the rate of speed at which woman 114 is moving. One or more of these characteristics may be compared to various criteria to determine if woman 114 deserves further processing.

In an illustrative example, the basic tasks of any automated system for monitoring of people, vehicles, and other objects are object detection, tracking, and categorization. These tasks are particularly challenging in the presence of rapid scene changes such as illumination, moving doors, uninteresting moved objects, and the like.

This example uses a method that instead of tracking objects detected as interesting objects (or interesting features), tracks a three-dimensional time-space accumulated object using motion history images as described above. These three-dimensional blobs are then tracked using a conventional blob tracker for improved object detection, tracking, and categorization.

This example method is based on accumulating motion silhouettes that are obtained by frame-to-frame differencing or by a learned background model. Blobs are formed using these accumulated frames. A three-dimensional blob (motion history blob) is extracted based on an accumulation of the frames.

Certain criteria are then applied to the blobs, and only those blobs that satisfy the criteria are tracked using standard blob trackers. An example of a criteria that is applied is the duration of the blob, which is the time difference between the first silhouette in the blob and the last silhouette in the blob. An assumption is made that human motion of interest is constant motion of a similar direction through a short time span, (but enough of a time span to be relevant).

Through the use of duration, short motions that are usually irrelevant in the scene are removed before a tracker is initialized. The accumulated three-dimensional blob also provides a method for ignoring movements that are random in time or space. Other than obtaining a track of the monitored object, information is extracted from the three-dimensional blobs that help categorize the contents of the object. For example, contents of the object such as whether or not the object is a person, and some personal attributes, such as the number of people within the blob, the width of the people, and the like may be extracted from the blob.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for object analysis using motion history comprising:
    receiving video data comprising a plurality of frames of a scene comprising one or more elements;
    processing the video data to produce a motion history image corresponding to a three-dimensional representation of the one or more elements as a plurality of motion history values, wherein the motion history values of at least one of the elements comprises timestamps; and
    processing the motion history image of at least one of the elements to produce a motion history blob corresponding to a boundary of the motion history image of at least one of the elements, wherein certain criteria are applied to blobs and only those blobs that satisfy the criteria are tracked.

2. The method of claim 1, further comprising:
    ignoring the element if the characteristic of the motion history image does not satisfy the criteria.

3. The method of claim 1, wherein the characteristic of the motion history image is a shape of the motion history blob, and the criteria is a shape criteria.

4. The method of claim 1, wherein the characteristic of the motion history image is the difference between the maximum timestamp and the minimum timestamp of the motion history values within the motion history blob, and the criteria is a time duration criteria.

5. The method of claim 4, wherein the time duration of the motion history image is measured in a number of frames in the motion history values within the motion history blob, and the time duration criteria is a number of frames.

6. The method of claim 1, further comprising:
    processing the motion history values within the motion history blob to determine one or more attributes of the element.

7. A computer system configured for object analysis using motion history, the computer system comprising:
    a memory configured to store video data; and
    a processor coupled to the memory configured to:
        receive video data comprising a plurality of frames of a scene comprising one or more elements;
        process the video data to produce a motion history image corresponding to a three-dimensional representation of the one or more elements as a plurality of motion history values, wherein the motion history values of at least one of the elements comprises timestamps; and
        process the motion history image of at least one of the elements to produce a motion history blob corresponding to a boundary of the motion history image of at least one of the elements, wherein certain criteria are applied to blobs and only those blobs that satisfy the criteria are tracked.

8. The computer system of claim 7, wherein the processor is further configured to:
    ignore the element if the characteristic of the motion history image does not satisfy the criteria.

9. The computer system of claim 7, wherein the characteristic of the motion history image is a shape of the motion history blob, and the criteria is a shape criteria.

10. The computer system of claim 7, wherein the characteristic of the motion history image is the difference between the maximum timestamp and the minimum timestamp of the motion history values within the motion history blob, and the criteria is a time duration criteria.

11. The computer system of claim 10, wherein the time duration of the motion history image is measured in a number of frames in the motion history values within the motion history blob, and the time duration criteria is a number of frames.

12. The computer system of claim 7, wherein the processor is further configured to: process the motion history values within the motion history blob to determine one or more attributes of the element.

13. A non-transitory computer readable medium having stored thereon program instructions object analysis using motion history, that when executed by a computer system, direct the computer system to:
receive video data comprising a plurality of frames of a scene comprising one or more elements;
process the video data to produce a motion history image corresponding to a three-dimensional representation of the one or more elements as a plurality of motion history values, wherein the motion history values of at least one of the elements comprises timestamps; and
process the motion history image of at least one of the elements to produce a motion history blob corresponding to a boundary of the motion history image of at least one of the elements, wherein certain criteria are applied to blobs and only those blobs that satisfy the criteria are tracked.

14. The non-transitory computer readable medium of claim 13, wherein the instructions further direct the computer system to:
ignore the element if the characteristic of the motion history image does not satisfy the criteria.

15. The non-transitory computer readable medium of claim 13, wherein the characteristic of the motion history image is a shape of the motion history blob, and the criteria is a shape criteria.

16. The non-transitory computer readable medium of claim 13, wherein the characteristic of the motion history image is the difference between the maximum timestamp and the minimum timestamp of the motion history values within the motion history blob, and the criteria is a time duration criteria.

17. The non-transitory computer readable medium of claim 16, wherein the time duration of the motion history image is measured in a number of frames in the motion history values within the motion history blob, and the time duration criteria is a number of frames.

18. The non-transitory computer readable medium of claim 13, wherein the processor is further configured to:
process the motion history values within the motion history blob to determine one or more attributes of the element.

\* \* \* \* \*